United States Patent [19]

Reüm et al.

[11] Patent Number: 4,620,516

[45] Date of Patent: Nov. 4, 1986

[54] APPARATUS FOR INJECTING FUEL INTO COMBUSTION CHAMBERS OF INTERNAL COMBUSTION ENGINES, IN PARTICULAR SELF-IGNITING INTERNAL COMBUSTION ENGINES

[75] Inventors: Helmut Reüm, Stuttgart; Thomas Frey, Friolzheim; Werner Grünwald, Gerlingen; Ernst Imhof, Münchingen; Iwan Komaroff, Regensburg; Günther Schmid, Stuttgart; Kurt Schmid, Ditzingen, all of Fed. Rep. of Germany

[73] Assignee: Robert Bosch GmbH, Stuttgart, Fed. Rep. of Germany

[21] Appl. No.: 704,135

[22] Filed: Feb. 21, 1985

Related U.S. Application Data

[63] Continuation of Ser. No. 504,741, Jun. 16, 1983, abandoned.

[30] Foreign Application Priority Data

Aug. 14, 1982 [DE] Fed. Rep. of Germany ....... 3230387
Mar. 1, 1983 [DE] Fed. Rep. of Germany ....... 3307109

[51] Int. Cl.⁴ .............................................. F02P 19/00
[52] U.S. Cl. ..................................... 123/275; 123/252; 123/255; 123/261
[58] Field of Search .............. 123/252, 255, 261, 275, 123/279, 281, 283, 298, 305; 165/47 H

[56] References Cited

U.S. PATENT DOCUMENTS

| | | |
|---|---|---|
| 1,693,931 | 12/1928 | Lowe . |
| 2,108,706 | 2/1938 | Crillon .................................. 123/252 |
| 2,853,060 | 9/1958 | Hockel ................................. 123/281 |
| 2,855,908 | 10/1958 | Pflaum ................................. 123/283 |
| 3,955,362 | 5/1976 | Jones et al. ......................... 123/275 |
| 4,075,996 | 2/1978 | Hisserich ............................. 123/275 |

FOREIGN PATENT DOCUMENTS

| | | |
|---|---|---|
| 0300842 | 9/1913 | Fed. Rep. of Germany ...... 123/298 |
| 0834467 | 2/1952 | Fed. Rep. of Germany . |
| 2416804 | 10/1975 | Fed. Rep. of Germany ...... 123/255 |
| 3010591 | 10/1980 | Fed. Rep. of Germany . |
| 0024041 | 2/1907 | Sweden ............................... 123/252 |
| 0366795 | 2/1932 | United Kingdom ................ 123/261 |
| 0487454 | 6/1938 | United Kingdom ................ 123/261 |

Primary Examiner—Parshotam S. Lall
Attorney, Agent, or Firm—Edwin E. Greigg

[57] ABSTRACT

An apparatus for the injection of fuel into combustion chambers, in particular of self-igniting internal combustion engines, having an injection nozzle (10) and a subsequent glow body (20), which has a conduit (30) surrounded by heatable walls (26) and serving for the passage therethrough of the injected streams. At least one lateral opening (32) discharges into this conduit (30), the opening preferably communicating with a region (46) of the combustion chamber (36) remote from the core region of the ignition. The air aspirated through the lateral opening (32) warms up and enters into the peripheral zone of the injected streams, where the result is an air-fuel ratio and temperature conditions which are very favorable for ignition. Less heat energy is required to initiate the ignition than in the known apparatus of this general type. By eliminating the conventional glow plugs, which interrupt the movement of air in the combustion chambers, increased power is attained and the emission of soot is reduced sharply.

27 Claims, 11 Drawing Figures

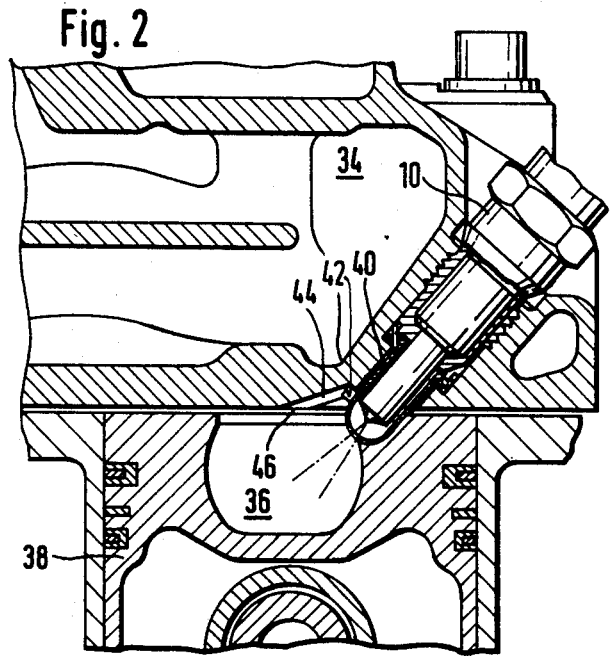
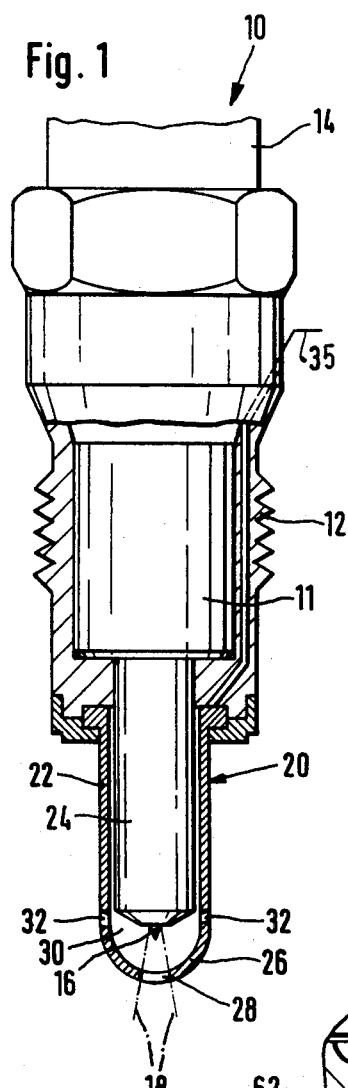
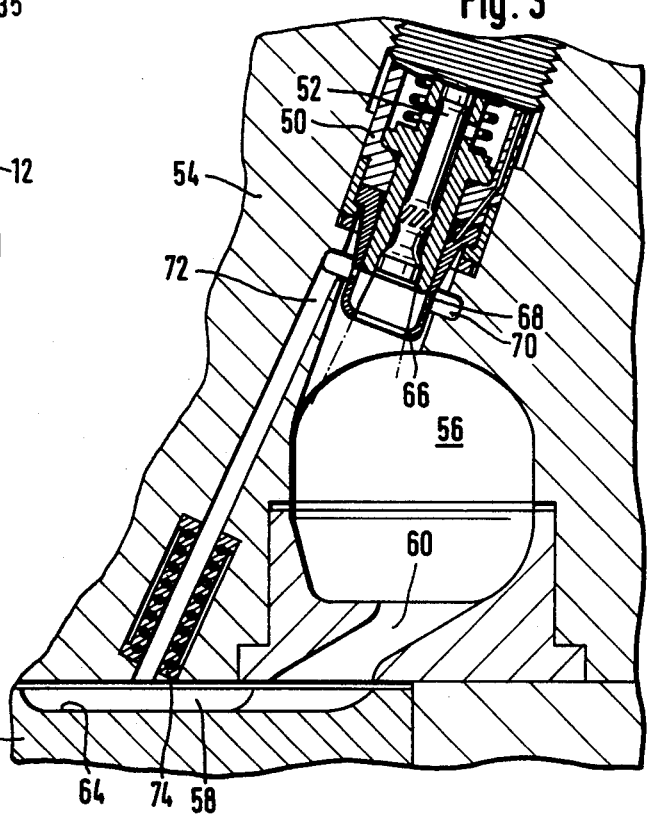

APPARATUS FOR INJECTING FUEL INTO COMBUSTION CHAMBERS OF INTERNAL COMBUSTION ENGINES, IN PARTICULAR SELF-IGNITING INTERNAL COMBUSTION ENGINES

This is a continuation of copending application Ser. No. 504,741 filed June 16, 1983, now abandoned.

BACKGROUND OF THE INVENTION

The invention is based on an apparatus for injecting fuel into combustion chambers of internal combustion engines, in particular self-igniting combustion engines. In a known apparatus of this general type (French Pat. No. 1,382,697), the injector effect of the injected stream produces a severely negative pressure in the conduit of the glow body, which cannot be compensated for, because there are no ventilation openings at the side of the glow body or because a ventilation gap between the injection nozzle and the glow body is lacking. Instead, air is periodically forced in a compulsory manner into the conduit of the glow body counter to the direction of the injected stream and passing to one side of the injected stream. This has a very unfavorable effect on the direction, shape and speed of the injected stream. The injected stream flutters and undergoes inward compression at one side. It loses speed and is poorly distributed in the combustion chamber. This results in not only increased emission of soot but also losses of power.

OBJECT AND SUMMARY OF THE INVENTION

The apparatus according to the invention has the advantage over the prior art that it is possible to avoid braking the injected stream, caused by establishing negative pressure and by stream deformation in the glow body conduit, at practically all the operating points of the engine, so that the injected streams exit from the conduit with the desired geometrical shape and unbraked, with a maximum exit speed. The air aspirated into the conduit warms up and rushes into the peripheral zone of the injected stream, where fuel droplets are located which are finer in distinction to those in the central zone, and where furthermore, because of a lower droplet density than in the center of the stream, a fuel-air ratio prevails which is very favorable for both ignition and combustion. As the stream flows through the conduit, the peripheral zone of the injected stream is supplied with heat, so that when the injected stream exits into the combustion chamber, the cloud comprised of droplets, vapor and air that surrounds the center of the injected stream will ignite. Since in terms of proportions this cloud represents only a small part of the total quantity in the injected stream, the glow device according to the invention requires substantially less heat energy to initiate ignition than do known devices of the general type. In addition, the energy with which the injected stream enters does not undergo reduction, so that the injected stream is capable of spreading out in the combustion chamber in an unhindered manner, surrounded by an envelope which is already burning.

It is particularly advantageous if the ventilation openings that communicate with a portion of the combustion chamber which is remote from the central ignition zone and at the beginning of combustion has a high fresh-air component. As a result, the oxygen component which is added to the injected stream in the glow body can be increased, and the readiness of the fuel-air mixture to ignite can be still further improved. In internal combustion engines which have a combustion chamber subdivided into a main combustion chamber and a secondary combustion chamber, the ventilation openings efficaciously communicate with the main combustion chamber at a preferred location. Also, the glow plugs or glow pins that serve as aids to starting such internal combustion engines, which are the cause of substantial flow losses in the secondary combustion chamber and which intensify the emission of soot, can be eliminated. As a result of the apparatus according to the invention, an increase in power is attained and the emission of soot is reduced.

The readiness of the fuel-air mixture to ignite can be still further improved by providing that the ventilation openings communicate with the combustion chamber via a conduit which contains an electric heating element.

A simple structural realization is attained if the glow body passes in a well-fitting manner, at least in the vicinity of the ventilation openings, through a bore of the housing wall either receiving the injection nozzle or surrounding the combustion chamber and if the housing wall has an annular groove into which the ventilation openings discharge and which communicates with the combustion chamber via a conduit.

The ventilation openings can be embodied directly in the glow body, in the form of apertures in the wall, conduits or the like. In that case, the aspirated air can be introduced in a well-aimed manner into particular peripheral zone areas of the injected streams. However, the glow body can also be disposed spaced apart axially from the injection nozzle, whereupon the annular gap between the parts serves as the lateral ventilation opening. In that case, the bottom of the nozzle body is acted upon by the aspirated air in a well-defined manner and kept from one instance to another at a temperature which is capable of minimizing carbonization of the injection opening.

The injection nozzle can furthermore be preferably followed by a structural component having a conduit for the passage therethrough of the injected streams which is narrowed in the manner of a convergent orifice. The narrowest cross section of the conduit is complementary to the cross-sectional profile of the injected streams at this location. The adaptation to the size of the lateral ventilation openings and the other parameters determining the injection quantity and the course of injection is efficaciously effected such that at least approximately over the entire opening stroke at the valve needle and at every operating point of the engine, the injected streams precisely fill out the narrowest cross section of the conduit. As a result, it is attained that during the injection process no combustion gases can reach or get into the throttle gap of the injection nozzle. Although in the final phase of an injection process combustion gases can get into the conduit, nevertheless any soot particles carried along with them are deposited on the walls of the conduit remotely from the nozzle opening of the injection nozzle and are then re-evaporated out in the heated state of the conduit. The conduit thus plays a protective role, preventing carbonization of the nozzle opening of the injection nozzle. At most, the injected streams passing therethrough moisten only slightly the wall areas of the conduit surrounding the narrowest cross section, so that in the unheated state of the conduit the hydrocarbon emissions remain within acceptable limits.

The conduit which narrows like a convergent orifice can be provided either directly in the glow body itself or in a separate component disposed upstream of the glow body, which component advantageously serves as a heat shield for the areas of the injection nozzle oriented toward the glow body. If the conduit is disposed in the glow body, it can advantageously comprise one section which narrows like a convergent orifice and an adjoining section which widens in the manner of a diffusor, in the vicinity of which further air is aspirated into the injected streams of the fuel. This latter section can preferably also have the heating elements of the glow body, so that only a small portion of the heating warmth is radiated back onto the nozzle body of the injection valve, while the major portion is radiated onto the injected fuel.

The glow body can advantageously be of ceramic material, and the heating elements can efficaciously be applied in the form of thin metal coatings onto the conduit wall, and as needed on the outer jacket of the glow body as well. These coatings can be caused to reach glowing heat, with a controlled passage therethrough of electrical current. It is also possible to control individual zones of the coatings independently of others and thereby to attain various glowing states in a well-aimed manner, so as to adapt the quality of the stream and of the ignition to the requirements for optimal operation at a given operational point of the engine.

A simple embodiment is attained if the glow body is embodied as a glow coil. This element may be embedded in a ceramic support body, preferably being sintered into the support body at various points. This has the advantage that the glow coil itself does not have to be stable in shape, and the wire cross section of the glow coil can be reduced. The result is lower heating currents, as well as very short heating times, thus saving energy. The ceramic support body furthermore electrically shields the glow coil from the outside, and can also serve as a heat reservoir in the case of a relatively long glow process.

The glow coil may advantageously have a rectangular cross section, and the wire of the glow coil may efficaciously be undulant in the direction of its longitudinal axis. As a result, a larger conduction length and conduction surface area are attained, as well as a reduction of the surface area of the glow coil which is in contact with the ceramic support body. For the fixation of the glow coil, its contact points with the support body are advantageously sintered to the support body; as a result of the undulation of the glow coil wire, the coil is nevertheless still capable of expanding and contracting freely. Another opportunity for combining the glow coil with the ceramic support body is afforded by providing that the glow coil be placed in a well-fitting manner into a groove of the still-unsintered support body and then clamped in the groove by a dimensional shrinkage and subsequently tensed radially during the sintering of the support body.

A nozzle body of a conventional injection nozzle can be used practically without modification if the glow body is secured on the nozzle tensioning nut with which the nozzle body is firmly tightened on the nozzle holder.

The glow body and its holder means can also be embodied as an inlaid part and fastened firmly between the injection nozzle and a shoulder in the housing bore receiving the injection nozzle. In this case the supply of current may be realized in various ways.

Further structural features of the apparatus according to the invention will be explained in connection with the exemplary embodiments to be described below.

The disposition of a glow body downstream of the injection nozzle in accordance with the invention can advantageously also be used in burners operated with liquid fuel, such as in oil-carburetion furnaces for household use.

The invention will be better understood and further objects and advantages thereof will become more apparent from the ensuing detailed description of seven preferred embodiments taken in conjunction with the drawings.

BRIEF DESCRIPTION OF THE DRAWINGS

FIG. 1 shows the portion oriented toward the combustion chamber of an injection nozzle according to a first exemplary embodiment of the invention, seen in a side view and partially in section;

FIG. 2 is a partial section taken through a Diesel engine having an undivided combustion chamber and with the injection nozzle according to FIG. 1;

FIG. 3, as the second exemplary embodiment of the invention, is a partial section taken through a Diesel engine having a divided combustion chamber and an injection nozzle which opens outward;

DESCRIPTION OF THE PREFERRED EMBODIMENTS

Figure 4:
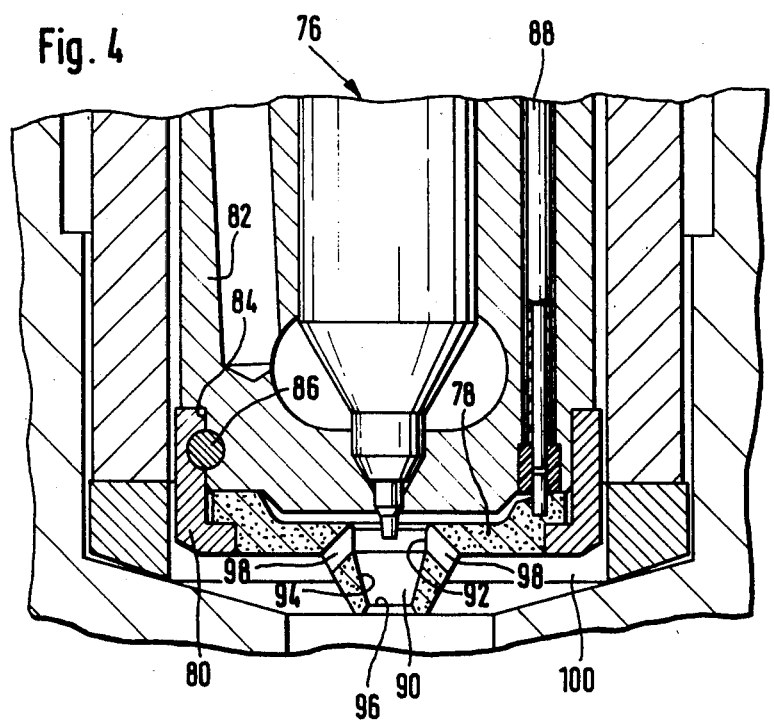
FIG. 4 is a partial section taken through the third exemplary embodiment of the invention.

The injection nozzle 10 of FIG. 1 has a nozzle body 11, which is firmly fastened to a nozzle holder 14 by means of a sleeve nut 12. The elements 11 and 14 are of conventional types available on the market and are therefore not shown or described in detail. The injection nozzle 10 is embodied as a throttling pintle nozzle, the valve needle of which has a throttling pintle 16 protruding out from the nozzle body 11. The lines 18 indicate the conical shape of the stream of injected fuel. A hole-type nozzle could also be provided, instead of the throttling pintle nozzle.

A tubular glow body 20 having relatively thin walls is fastened to the sleeve nut 12, and its cylindrical jacket section 22 surrounds a shaft 24 of the nozzle body 11 with little play. The bottom 26 of the glow body 20 is spherically curved and is provided with a central bore 28 for the passage therethrough of the injection cone 18. A conduit 30 is formed between the bottom 26 and the end wall of the nozzle body 11 and lateral openings 32 in the glow body 20 discharge into this conduit 30. The glow body 20 has an insulated heating body on its bottom 26 which is not seen in the drawing; it can be connected to a source of electric current via an electrical connection 34.

The injection nozzle 10 is incorporated according to FIG. 2 in the cylinder head 35 of a Diesel engine, the combustion chamber 36 of which is embodied in the piston 38. The glow body 20 protrudes through a bore 40 in the cylinder head 35 and is surrounded in the vicinity of the openings 32 by a partial annular groove 42 in the cylinder head 35. The partial annular groove 42 could, if needed, be augmented by an appropriately disposed partial annular groove in the piston 38 to form a closed annular groove completely surrounding the glow body 20 in the top dead center position of the piston 38.

The partial annular groove 42 communicates via a conduit 44 in the cylinder head 35 with the combustion chamber 36 at a point 46 at which the flame front does not arrive until a certain period of time following the ignition of the mixture.

The injected streams 18 exiting from the injection nozzle 10 aspirate air out of the combustion chamber 36 through the lateral openings 32, the partial annular groove 42 and the conduit 44. Because of the advantageous location of the point 46, this air still contains a high proportion of oxygen. The air aspirated into the conduit 30 heats up to a higher temperature level than that prevailing in the rest of the combustion chamber and reaches the peripheral zone of the injected streams, where the result is an air-fuel mixture which is very favorable for both ignition and combustion; upon its exit from the conduit 30 and its entrance into the combustion chamber 36, this air-fuel mixture ignites reliably.

In the exemplary embodiment shown in FIG. 3, an injection nozzle 50 is provided with a valve needle 52 which opens outward, and the structure of which is again known and will not be described in detail here. The injection nozzle 50 is built into the cylinder head 54 of a Diesel engine, the combustion chamber of which comprises a secondary combustion chamber 56 and a primary combustion chamber 58. The secondary combustion chamber 56 is formed in the cylinder head 54 and communicates via a bore 60 with the primary combustion chamber 58, which in the top dead center position of the piston 62 is located between the bottom of a recess 64 in the piston 62 and the cylinder head 54.

The injection nozzle 50 is provided with a glow body 66, which is embodied similarly to that of FIG. 1 and is secured to the injection nozzle. Lateral openings 68 are provided in the glow body 66, communicating via an annular groove 70 and a bore 72 in the cylinder head 54 with the primary combustion chamber 58. The bore 72 leads through an electrical heating element 74, which serves to preheat the air aspirated into the glow body 66. As a result of this preheating, the readiness of the fuel-air mixture to ignite is still further improved. The heating element 74 can be switched parallel to the heating means of the glow body 66 or may also be controlled independently thereof. A preheating means of this kind may naturally also be provided in the conduit 44 of the combustion chamber shown in FIG. 2.

In the exemplary embodiment of FIG. 4, an injection nozzle 76 has a flat glow body 78 of ceramic material, which is held on the end face of a nozzle body 82 by an annular body 80. The annular body 80 is placed upon an offset annular face 84 of the nozzle body 82 and held on the nozzle body 82 by a pin 86. A connection line 88 for a laminar heating element, not visible in the drawing, is passed through the nozzle body 82, which otherwise has the conventional structure of a throttling pintle nozzle.

The flat glow body 78 of FIG. 4 includes a conduit 90 for the passage therethough of the injected streams, and this conduit 90 has a cylindrical section 92 and adjoining it a convergently narrowed orifice section 94. The latter section 94 discharges at an annular edge 96. Lateral openings 98 discharge into the cylindrical section 92, connecting it with the adjoining region 100 of the combustion chamber. The convergently narrowed section 94 has the advantage that the injected streams practically do not moisten the annular edge 96 of the glow body 78, so that harmful hydrocarbon emissions when the glow body is unheated therefore remain within acceptable limits.

Figure 5:
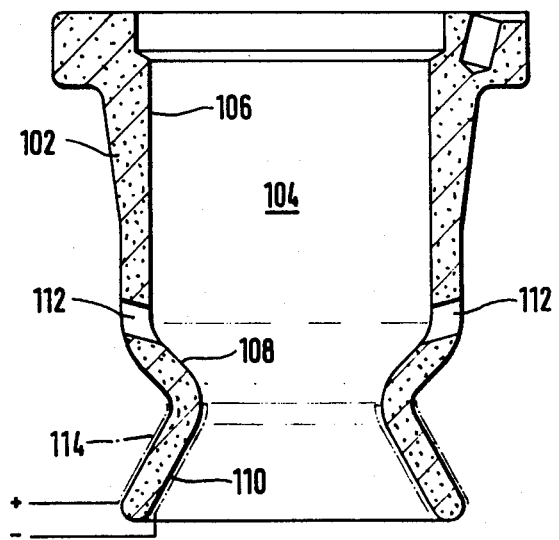
FIG. 5 shows a modified glow body of the injection nozzle according to FIG. 3 or 4.

In FIG. 5, a glow body 102 of ceramic material is shown, the conduit 104 of which comprises a cylindrical section 106, a convergently narrowed section 108 and adjoining this a diffusor-like divergent section 110. Lateral openings 112 discharge into the conduit 104 directly at the beginning of section 108, which causes the glow body 102 to exhibit the same advantageous behavior in terms of harmful emissions as does the glow body of FIG. 4 because of its section 94. In the diffusor-like divergent section 110, further heated air is admixed with the injected streams, which again has a positive effect on the ignitability of the mixture. A heating coil 114 is applied as shown to the inside and outside of the section 110 in the form of laminar metal coatings. Restricting the heating coil 114 to section 110 has the advantage that only a small part of the generated heat is reflected back onto the injection nozzle, while the major portion is radiated onto the fuel stream.

Figure 6:
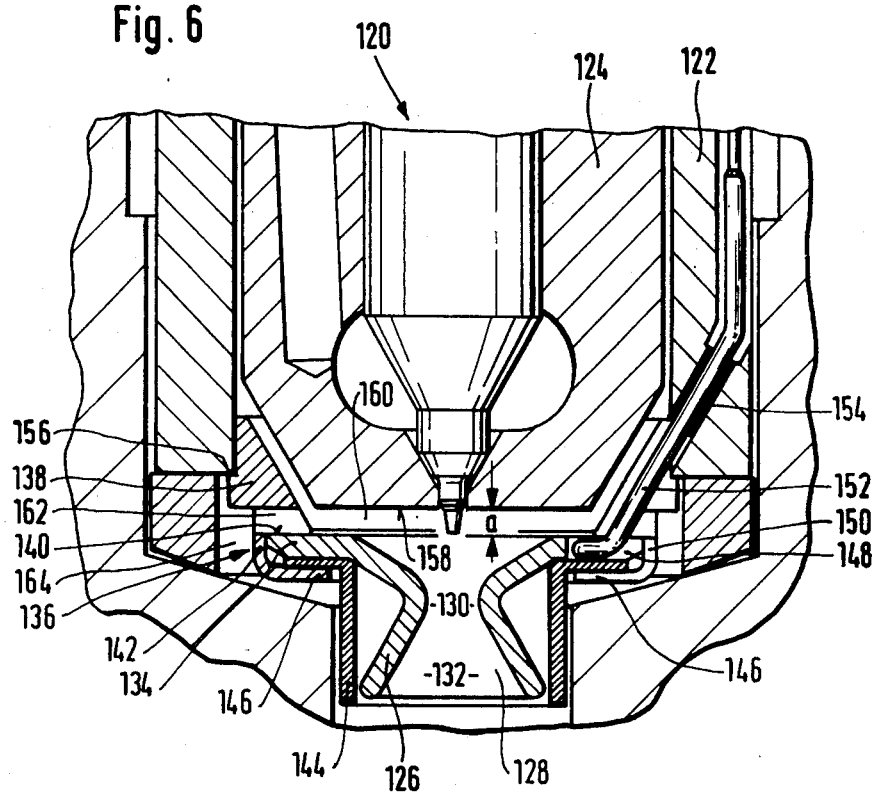
FIG. 6 is a partial section taken through the fourth exemplary embodiment of the invention.

In the realization according to FIG. 6, an injection nozzle 120 embodied as a throttling pintle nozzle has a sleeve nut 122, which presses a nozzle body 124 against a nozzle holder, not shown. The nozzle body 124 is followed by an electrically heated ceramic glow body 126, which includes a conduit 128 through which the injected streams pass. The conduit 128 has a convergently tapered first section 130, which is adjoined by a diffusor-like widened second section 132. The narrowest cross section of the conduit 128 is dimensioned such that at all operating points of the engine, the injected streams leaving the injection nozzle pass through the conduit 128 substantially without touching it.

The glow body 126 has a ring flange 134, which is held in a holder means generally identified as 136, by way of which the glow body 126 is secured to the sleeve nut 122. The holder 136 has a annular part 138, which is pressed into the sleeve nut 122 and surrounds the front end of the nozzle body 124 at some distance from it. The annular part 138 forms an axial shoulder 140, on which the ring flange 134 of the glow body 126 rests. The shoulder 140 is surrounded by a collar 142 molded onto the annular part 138, and the collar 142 surrounds the ring flange 134 with slight clearance and centers the glow body 126 relative to the axis of the nozzle body 124. A metal protective sheath 144 rests on the ring flange 134 at the bottom and surrounds the glow body 126 with radial clearance.

The collar 142 of the holder 136 is provided with individual tabs 146 distributed uniformly around the circumference. After the insertion of the glow body 126 and the protective sheath 144 into the collar 142, the tabs are radially inwardly bent over to retain the body 126 and protective sheath firmly on the ring part 138 such that they are shakeproof and are centered. The force with which the bending over of the tabs is performed is dimensioned such that the glow body 126 is sure not to be damaged.

Slits 148 and 150 which correspond with one another are formed in the glow body 126 and the holder 136, through which slits an electrical connecting line 152 is passed for an electrical heating element attached to the glow body 126 but not shown here. The heating element may efficaciously be applied in the form of a thin metal coating, for instance by vapor-depositing, on the wall of the conduit 128 and if needed on the outer jacket of the glow body 126 as well. The connecting lin 152 is insulated in a pressureproof manner by means of a melted glass insert 154 and is passed all the way through the sleeve nut 122 to an external connection contact. The second connecting end of the heating element is connected to ground via the holder 136 and the sleeve nut 122.

At its outer circumference the ring part 138 has a shoulder 156, which assures that the other shoulder 140 of the ring part 138 and thus the glow body 126 are at a definite distance a from the adjacent end face 158 of the nozzle body 124. As a result, an annular chamber 160 is formed between the nozzle body 124 and the glow body 126, which chamber communicates via a plurality of bores 162 in the ring part 138 with a prechamber 164 of the combustion chamber of the engine.

Figure 7:
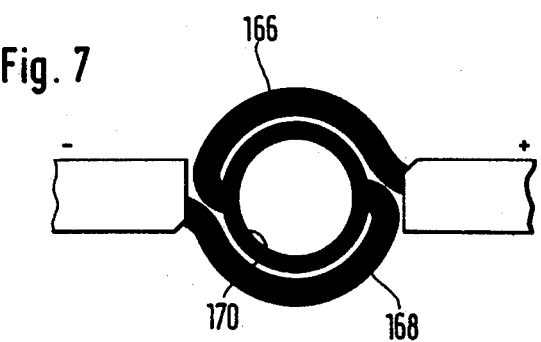
FIG. 7 is a layout of a heating device for the glow body according to FIGS. 4–6.

FIG. 7 shows how a heating element for a glow body shown in FIGS. 4–6 may advantageously be designed, in order to encompass all the regions of the glow body which are suitable for being heated. The heating element as proposed in this instance has two conductor strands 166, 168, which are to be attached to an outer jacket face of the glow body surrounding the conduit for the injected streams. The conductor strands 166, 168 may be attached to various sections of the jacket face or, being interwoven with one another like a bifilar winding, may cover the entire glow body jacket surface to be heated. Each conductor strand 166, 168 is connected at one end to an external positive or negative connection, respectively, and at the other end to a conductor strand 170, which uniformly covers the entire surface to be heated on the wall of the fuel conduit. The connections of the conductor strands 166, 168 to the inner conductor strand 170 are selected such that two parallel branches result in the inner conductor strand 170, the two having approximately the same electrical resistance.

Figure 8:
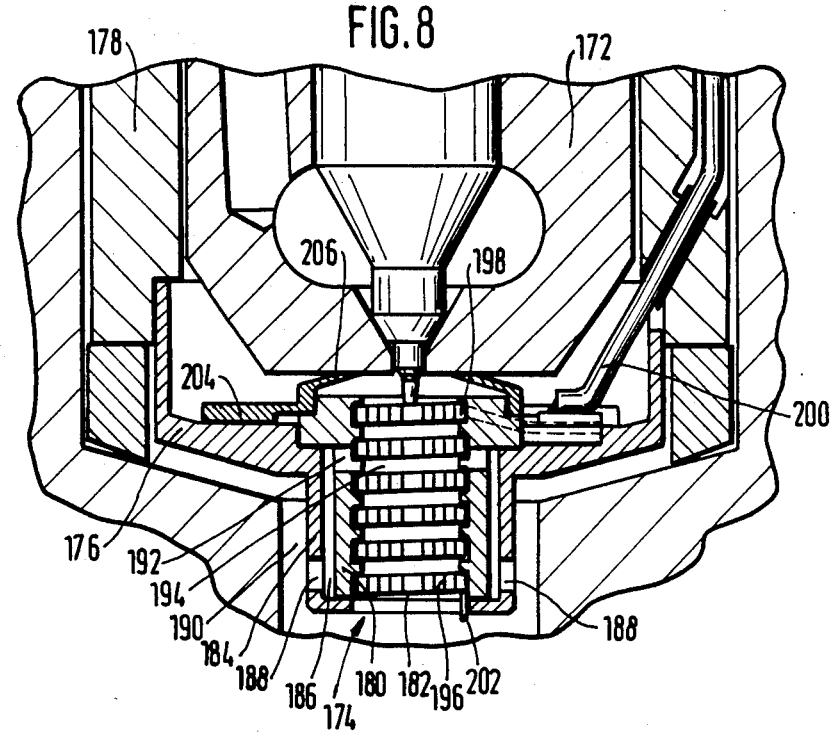
FIG. 8 is a partial section taken through the fifth exemplary embodiment of the invention.

In the exemplary embodiment of FIG. 8, a structural component 174 is disposed following a nozzle body 172 of the injection nozzle. As its basic supporting element, this component 174 has a metal flange ring 176, which is secured to a sleeve nut 178. A bush-like ceramic support body 180 for a glow coil 182 is secured in the flange ring 176, and the glow coil 182 is embedded in the wall of the central inner bore of the support body 180. The support body 180 is surrounded at a distance by a metal protective sheath 184, which is molded in one piece with the flange ring 176. An annular intermediate space 186 is formed between the support body 180 and the protective sheath 184. The space 186 communicates via bores 188 in the protective sheath 184 with a prechamber 190 of the combustion chamber. The space 186 also communicates via bores 192 in the support body 180 and via the gap 194 between the windings of the glow coil 182 with the interior of the glow coil 182. Deviating from what is shown in the drawing, the pairs of bores 188 and 192 can also be disposed radially offset from one another.

The glow coil 182 itself is made of a wire having a rectangular cross section, which is waved along its longitudinal axis, as indicated by the shading lines 196 in FIG. 8. The peaks of the waves of the glow coil wire which point outward touch the bore wall of the support body 180. At the contact points, the glow coil 182 is connected to the support body 180, efficaciously by means of sintering. The support body 180 has a helical rectangular groove, in which the glow coil 182 is placed in a well-fitting manner while the ceramic is still in the "green" state, that is, in the unsintered state. Upon sintering, the dimensional shrinkage of the ceramic causes the glow coil 182 to be clamped into the groove at its longitudinal edges and simultaneously also tenses it radially.

One connecting end 198 of the glow coil 182 is connected via a lead 200 passed in an insulated manner through the sleeve nut 178 with an external connection contact, while in contrast the other connecting end 202 is connected to ground via the protective sheath 184, the flange ring 176 and the sleeve nut 178. A heat-protection ring 204 is secured to the flange ring 176 and is provided with an annular lip 206, which presses firmly and tightly against the adjacent end of the nozzle body 172. The heat-protection ring 204 simultaneously serves to hold the ceramic support body 180 firmly in the flange ring 176.

The apparatus according to FIG. 8 has the advantage that the glow coil 182 is embedded in a prefabricated component 174 such that it is electrically insulated and is protected from being damaged. It is thus possible for the glow coil 182 to be made of a rather thin wire, so that low heating currents and brief heating times are possible. The ceramic support body 180 can furthermore serve as a heat reservoir in the case of relatively long glowing processes. As a result of the rectangular cross section of the wire, the glow coil wire has a larger surface area in comparison with a wire of the same mass but with a circular cross section. As a result of its waves and the localized points of connection with the support body 180, a greater wire length can be accommodated in the same space, and the different heat expansions of the two materials can be compensated for. Because of the localized contacts of the glow coil 182 with the support body 180, the flow of heat to the support body 180 is throttled severely, and the process of heating the glow coil 182 up to the desired high temperature is still further accelerated. The heat radiated by the combustion chamber or by the glow coil 182 toward the injection nozzle is conducted away from its injection opening and onto the sleeve nut 178 via the flange ring 176 or the heat-protection ring 204. By means of the axial and preferably also radial offsetting of the pairs of bores 188, 192 in the support body 180, the aspirated air is directed over a greater surface area of the support body 180. As a result, a good heat exchange between the aspirated air and the support body 180 as well as good preheating of the air are attained. The described apparatus has the further advantage that fissures in the ceramic support body 180 do not necessarily cause the failure of the entire glow attachment.

A platinum alloy of a stabilized fine grain and containing a maximum of 79% platinum, a maximum of 40% rhodium, and not more than 1% iridium has proved to be an advantageous material for the glow coil 182. An alloy of this kind has a high melting point, great mechanical strength and high chemical resistance.

Figure 9:
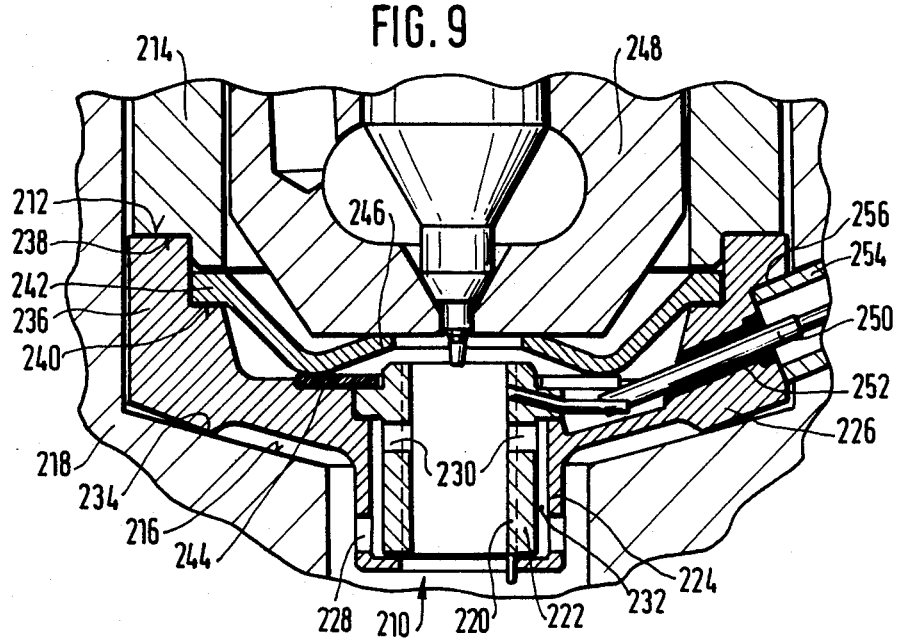
FIG. 9 is a partial section view taken through the sixth exemplary embodiment of the invention.

In the exemplary embodiment of FIG. 9, a glow attachment 210 which is a prefabricated structural unit is embodied as an inlay part, which is fastened in the mounting opening of the engine housing 218 between an end face 212 of a sleeve nut 214 of the injection nozzle on the one hand and an annular shoulder 216 on the other. As in the embodiment of FIG. 8, the glow attachment 210 has a thin-walled metal glow body 220, which is embedded in a ceramic support body 222. The support body 222 is surrounded with radial clearance by a metal protective sheath 224, which is connected integrally with a flange ring 226. In this case again, bores 228, 230 in the protective sheath 224 and the support body 222, as well as the annular chamber 232 existing between these elements, serve to guide the aspirated air.

The flange ring 226 has a knife-like sealing edge 234, which rests on the annular shoulder 216 and seals the mounting opening from the outside. The flange ring 226 further has a rim 236 drawn upward, which has a flat sealing face 238 corresponding with the end face 212 of the sleeve nut 214 and also has a bearing surface 240, offset from the sealing face 238, intended for a heat-protection ring 242. The heat-protection ring 242 presses against a plate 244 firmly holding the support body 222 in the flange ring 226 and is provided with an annular lip 246, which rests with elastic tension on the end face of a nozzle body 248. The heat-protection ring 242 is secured on the flange ring 226 and is dimensioned at the outer annular rim such that it does not prevent the sleeve nut 214 from being seated upon the sealing face 238.

The glow body 220 is connected to an electrical connecting line 250, which is passed through the flange ring 226, being insulated in a pressureproof manner by a melted glass insert 252, and on into a protective tube 254 of rigid shape. The protective tube 254 is inserted into a bore of the engine housing 218 which is accessible from the outside, and it engages a localized depression 256 at the circumference of the flange ring 226. When the parts are assembled, first the prefabricated glow attachment 210 is inserted obliquely into the opening intended for mounting this assembly; the connecting line 250 is thereby passed through the bore in the engine housing 218 which is intended for the protective tube 254. Then the protective tube 254 is inserted; it serves as a means of preventing twisting of the glow attachment 210 when the injection nozzle is inserted and also as a guard to prevent the connecting line 250 from being sheared off.

The embodiment of the glow attachment as an inlay part offers engine designers greater flexibility in designing not only combustion chambers but also the entire engine housing or cylinder head as well.

Figure 10:
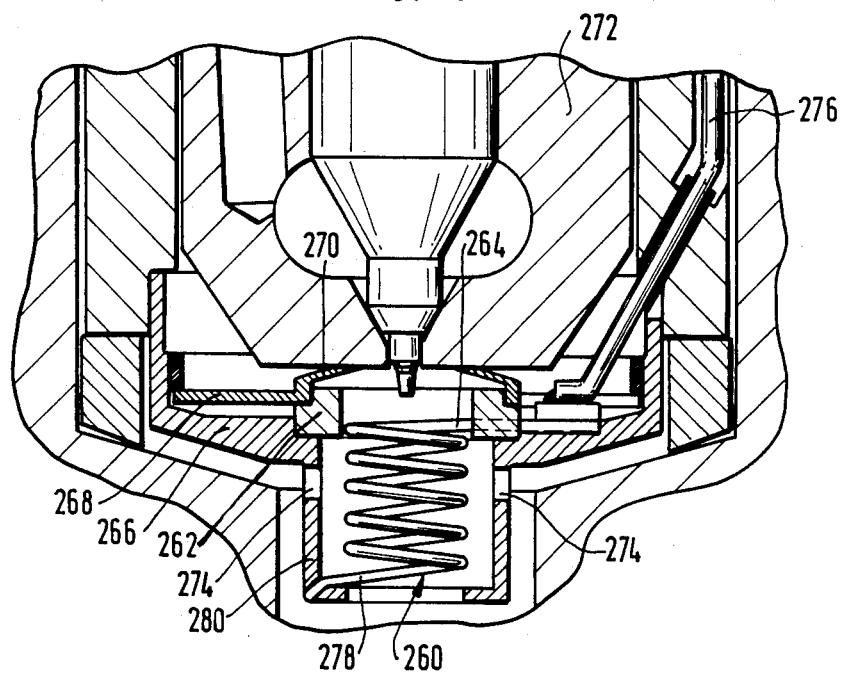
FIG. 10 is a partial section taken through the seventh exemplary embodiment of the invention.

The exemplary embodiment of FIG. 10 differs from the exemplary embodiment of FIG. 8 in that an independently stable glow coil 260 is provided, which does not require a ceramic support body. This latter element is replaced by a ceramic annular body 262, through which one end 264 of the wire making up the glow coil 260 is passed. For firmly holding the ceramic annular body 262 on a metal flange ring 266, a yielding metal disk 268 is provided, on which an annular lip 270 is formed, which in turn rests in a prestressed manner on a nozzle body 272 and conducts the heat away therefrom. The flange ring 266 substantially agrees with the flange ring 176 of FIG. 8, except that the axial position of the lateral ventilation openings 274 is different. It also performs the same function as the flange ring 176. The upper end 264 of the wire of the glow coil 260 is connected with a continuing connection line 276, while the lower end 278 of the wire is secured in a bore of a protrusion 280 of the flange ring 266 surrounding the glow coil 260 in a protective manner.

The realization according to FIG. 10 has the advantage of a particularly large lateral ventilation cross section, through which the injected streams of fuel aspirate a large component of air.

Figure 11:
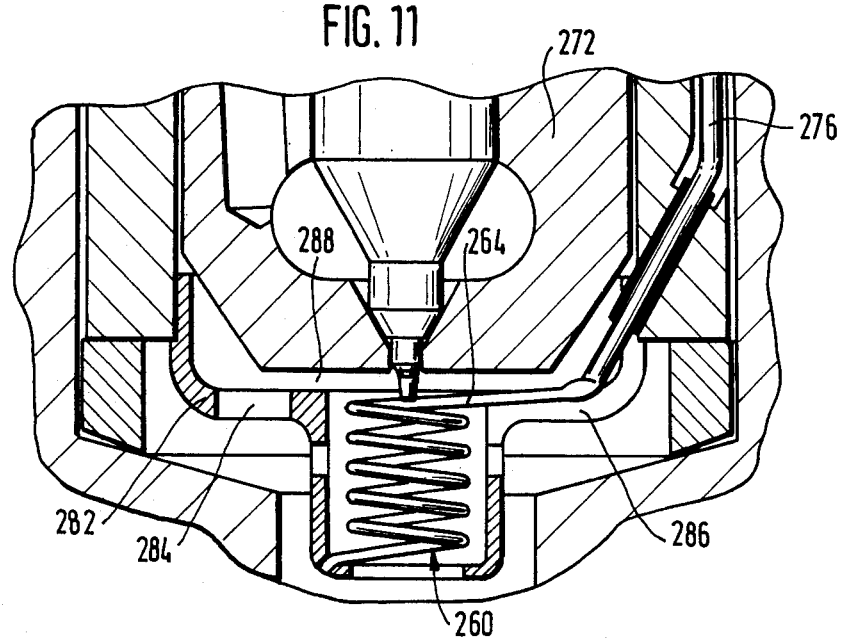
FIG. 11 shows a modification of the exemplary embodiment according to FIG. 10.

The variant embodiment shown in FIG. 11 differs from that of FIG. 10 substantially in that no means of heat protection is provided for the nozzle body 272. The upper end 264 of the wire of the glow coil 260 is connected directly with the connecting line 276. A flange ring 282 is provided that has a plurality of apertures 284, 286, through which air can flow out of the combustion chamber into an annular gap 288 between the flange ring 282 and the nozzle body 272 and from there can reach the injected streams. This embodiment is recommended for the case where the cooling effect of the air flowing via the end face of the nozzle body 272 predominates over the heating effect of the combustion chamber and the glow coil 260.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An apparatus for injecting fuel into the combustion chamber of a cylinder of self-igniting internal combustion engines, having an injection nozzle, said injection nozzle including an injection port, a glow body disposed downstream of said injection port of the injection nozzle which glow body has a passage, embodied by heatable structures, for heating a fuel injection stream, further having a first conduit surrounding the injection stream and including said passage which discharges into the combustion chamber and further having a second conduit, leading from the combustion chamber to at least one ventilation opening discharging into said first conduit and through which ventilation opening, as a result of injection action, the injection stream aspirates air out of the combustion chamber via the second conduit in which the heatable structures of the glow body are supported by a sheath at least partly forming said first conduit; the injection stream proceeds through said first conduit without touching the glow body; and the aspirated air is heated by said glow body and reaches peripheral zones of the injection stream directly and on all sides in the form of an air envelop.

2. An apparatus according to claim 1, in which: the ventilation opening communicates with a region of said combustion chamber which is remote from a core region of the ignition.

3. An apparatus according to claim 2, in which: said combustion chamber is divided into a secondary combustion chamber and a primary combustion chamber and the ventilation opening communicates with said primary combustion chamber.

4. An apparatus according to claim 2 in which: said ventilation opening communicates with said primary combustion chamber via a conduit, which contains an electrical heating element.

5. An apparatus according to claim 2, in which: the glow body passes at least in the vicinity of the ventilation opening through a bore of a housing wall receiving the injection nozzle, and said housing wall has an annular groove, into which the ventilation opening discharges and which communicates via a conduit with said combustion chamber.

6. An apparatus according to claim 1, in which: said ventilation openings is one of a plurality that extend through said glow body in the form of glow body wall passageways that communicate with said conduit.

7. An apparatus according to claim 6, in which: said conduit has a convergently narrowed portion for the passage therethrough of the injected streams disposed downstream of the injection nozzle, the narrowest cross section of said conduit approximating to the cross-sectional profile of the injected streams at this location.

8. An apparatus according to claim 7, in which: that said convergently narrowed conduit is in a heat shield disposed between the injection nozzle and the glow body.

9. An apparatus according to claim 6, in which: that said conduit comprises a convergently narrowed section and an adjoining section widened in diffusor-like fashion, the latter carrying said heatable means of said glow body.

10. An apparatus according to claim 1, in which: said ventilation opening comprises a laterally extending annular gap between adjacent ends of the injection nozzle and the glow body.

11. An apparatus according to claim 1, in which: said glow body is of ceramic material and the heating means is a metal laminar coating applied to the surface of said ceramic material.

12. An apparatus according to claim 11, in which: said glow body is mounted in a holder provided with means for fastening the glow body downstream of the injection opening of the injection nozzle.

13. An apparatus according to claim 1, in which: said glow body comprises a glow coil disposed coaxially with the injection nozzle.

14. An apparatus according to claim 13, in which: said glow coil is held in a ceramic support body.

15. An apparatus according to claim 1, in which: in that said glow body and a holder comprises an inlay part firmly fastened between the injection nozzle and a shoulder in a housing bore receiving the injection nozzle.

16. An apparatus according to claim 1, in which: said injection nozzle comprises: a nozzle body which is secured on a nozzle holder by means of a sleeve nut, said glow body being secured on the end face of the sleeve nut remote from the nozzle holder, by means of a plurality of uniformly distributed pins, at least one of which serves to carry electrical current to the glow body.

17. An apparatus according to claim 16, in which: a heat-protection ring of a material having good heat conductivity is secured on the flange ring, the heat-protection ring having an annular lip, which rests on said end face oriented toward it of the injection nozzle.

18. An apparatus according to claim 1, in which: a flange ring holds and centers the glow body on said injection nozzle, which flange ring at least partially shields an end face of said injection nozzle oriented toward the glow body from the combustion chamber.

19. An apparatus according to claim 1, in which: said glow body is surrounded by a metal protective sheath, there being a clearance space between the glow body and sheath.

20. An apparatus according to claim 1, in which: a supply line to the heatable means of the glow body passes through a conduit in said injection nozzle, and the gap between the supply line and the conduit wall is sealed in a pressureproof manner with a melted glass insert.

21. An apparatus for injecting fuel into a combustion chamber of a cylinder of a self-ignition internal combustion engine, comprising an injection nozzle, said injection nozzle including an injection port, a glow body surrounding said injection nozzle, said glow body including a conduit end extending downstream of said injection port of said injection nozzle, said conduit end including a central passage embodied by a heatable structure through which a fuel stream is injected without touching said glow body, said conduit end including at least one ventilation opening in a side thereof, said at least one ventilation opening corresponding to a second conduit extending from said combustion chamber whereby air is aspirated from said combustion chamber, injected into said conduit end of said glow body and heated by said glow body where the aspirated air reaches a peripheral zone of the injection stream and is mixed with said injection stream as it is injected from said central passage of said glow body.

22. An apparatus according to claim 21, in which: said ventilation openings is one of a plurality that extends through said glow body in the form of glow body wall passageways that communicate with said conduit.

23. An apparatus according to claim 21, in which: a flange ring holds and centers the glow body on said injection nozzle, which flange ring at least partially shields an end face of said injection nozzle oriented toward the glow body from the combustion chamber.

24. An apparatus according to claim 21, in which: the ventilation opening communicates with a region of said combustion chamber which is remote from a core region of the ignition.

25. An apparatus according to claim 24, in which: said combustion chamber is divided into a secondary combustion chamber and a primary combustion chamber and the ventilation opening communicates with said primary combustion chamber.

26. An apparatus according to claim 24, in which: said ventilation opening communicates with said primary combustion chamber via said second conduit, which contains an electrical heating element.

27. An apparatus according to claim 24, in which: The glow body passes at least in the vicinity of the ventilation opening through a bore of a housing wall receiving the injection, and said housing wall has an annular groove, from which the ventilation opening aspirates air and which communicates via said second conduit with said combustion chamber.

* * * * *